United States Patent
Periaswamy et al.

(10) Patent No.: US 8,494,235 B2
(45) Date of Patent: Jul. 23, 2013

(54) AUTOMATIC DETECTION OF LYMPH NODES

(75) Inventors: Senthil Periaswamy, Beaver Creek, OH (US); Xiang Zhou, Exton, PA (US); Yiqiang Zhan, Berwyn, PA (US); Arun Krishnan, Exton, PA (US)

(73) Assignee: Siemens Medical Solutions USA, Inc., Malvern, PA (US)

( * ) Notice: Subject to any disclaimer, the term of this patent is extended or adjusted under 35 U.S.C. 154(b) by 896 days.

(21) Appl. No.: 12/121,865

(22) Filed: May 16, 2008

(65) Prior Publication Data

US 2008/0298662 A1   Dec. 4, 2008

Related U.S. Application Data

(60) Provisional application No. 60/941,797, filed on Jun. 4, 2007.

(51) Int. Cl.
*G06K 9/00* (2006.01)

(52) U.S. Cl.
USPC .......................................... 382/128; 382/100

(58) Field of Classification Search
USPC .......................................... 382/100, 190, 128
See application file for complete search history.

(56) References Cited

U.S. PATENT DOCUMENTS

| | | | |
|---|---|---|---|
| 7,418,123 B2 * | 8/2008 | Giger et al. | 382/132 |
| 7,848,558 B2 * | 12/2010 | Giger et al. | 382/132 |
| 2004/0101181 A1 | 5/2004 | Giger et al. | |
| 2005/0105801 A1 | 5/2005 | Periaswamy | |
| 2005/0185838 A1 | 8/2005 | Bogoni et al. | |

FOREIGN PATENT DOCUMENTS

WO    02/101635 A    12/2002

OTHER PUBLICATIONS

Morice et al., "Lymph Node Involvement in Epithelial Ovarian Cancer: Analysis of 276 Pelvic and Paraaortic Lymphadenectomies and Surgical Implications," 2003, American College of Surgeons, pp. 198-205.*
International Search Report including Notification of Transmittal of the International Search Report, International Search Report, and Written Opinion of the International Searching Authority.

* cited by examiner

*Primary Examiner* — Shefali Goradia
(74) *Attorney, Agent, or Firm* — Peter Withstandley

(57) ABSTRACT

A method for detecting lymph nodes in a medical image includes receiving image data. One or more regions of interest are detected from within the received image data. One or more lymph node candidates are identified using a set of predefined parameters that is particular to the detected region of interest where each lymph node candidate is located. The identifying unit may identify the one or more lymph node candidates by performing DGFR processing. The method may also include receiving user-provided adjustments to the predefined parameters that are particular to the detected regions of interest and identifying the lymph node candidates based on the adjusted parameters. The lymph node candidates identified based on the adjusted parameters may be displayed along with the image data in real-time as the adjustments are provided.

18 Claims, 4 Drawing Sheets

AUTOMATIC DETECTION OF LYMPH NODES

CROSS-REFERENCE TO RELATED APPLICATION

The present application is based on provisional application Ser. No. 60/941,797, filed Jun. 4, 2007, the entire contents of which are herein incorporated by reference.

BACKGROUND OF THE INVENTION

1. Technical Field

The present disclosure relates to automatic detection and, more specifically, to the automatic detection of lymph nodes.

2. Discussion of Related Art

The human body includes hundreds of lymph nodes distributed primarily in the underarms, groin, neck, chest and abdomen. Because many forms of cancer are highly likely to produce lymph node metastasis, the surgical removal of lymph nodes, known as lymphadenectomy, may be performed as part of the surgical management of cancer.

For this reason, the location of lymph nodes within the body may be of particular interest to medical practitioners such as oncologists and radiologists that are involved in the diagnosis and treatment of cancer.

Traditionally, location of lymph nodes within medical images is performed manually by medical practitioners who review the medical image data and mark the medical images at the location of observed lymph nodes. As manual identification may be time consuming, unrepeatable and prone to error, computer aided lymph node detection is expected to benefit the provision of healthcare.

Lymph nodes, however, may be found in a wide variety of shapes and sizes. While many lymph nodes may have a substantially bean-shape, lymph nodes may vary widely in sphericity and size. For example, lymph nodes may vary in shape from being substantially elongated to being substantially spherical. Lymph nodes may also vary in size from being several millimeters to several centimeters.

Additionally, lymph nodes may substantially enlarge, for example, in the presence of disease. Accordingly, the size and shape of lymph nodes is highly variable.

The wide variety in the size and shape of lymph nodes makes them particularly difficult to automatically detect from medical images.

SUMMARY

A method for detecting lymph nodes in a medical image includes receiving image data. One or more regions of interest are detected from the image data. One or more lymph node candidates are identified using a set of predefined parameters that is particular to the detected region of interest where each lymph node candidate is located.

The received image data may be three-dimensional image data acquired from a CT, MR, PET or SPECT. The received image data may be sent from a medical image database. The one or more regions of interest may each represent a portion of the body where lymph nodes are commonly found. One of the one or more regions of interest may include underarms, groin, neck, mediastinal region or abdomen. Detecting one or more regions of interest may include performing wavelet-like feature extraction and machine learning methods.

Identifying the one or more lymph node candidates may include performing DGFR processing. The one or more identified lymph node candidates may be displayed along with the image data. The location of the one or more identified lymph node candidates may be highlighted or otherwise marked on the displayed image data.

The method may also include receiving user-provided adjustments to the predefined parameters that are particular to the detected regions of interest and identifying the lymph node candidates based on the adjusted parameters. The lymph node candidates identified based on the adjusted parameters may be displayed along with the image data in real-time as the adjustments are provided.

Identification of the one or more lymph nodes may be performed using computer vision approaches that are developed from machine learning using training data obtained from previously identified lymph nodes particular to the detected region of interest where each lymph node candidate is located.

The method may also include calculating one or more quantitative properties for each identified lymph node candidate. The quantitative properties may include size, sphericity or a distance to a lung wall.

Where one of the regions of interest is a mediastinal region, the method may also include automatically dividing the mediastinal region into one or more lymph node stations and providing, as one of the one or more quantitative properties, an indication of which lymph node station each identified lymph node candidate is located within.

The identification of lymph node candidates may be used to perform lymphadenectomy.

A system for detecting lymph nodes in a medical image includes a receiving unit for receiving image data, a detecting unit for detecting at least a mediastinal region from the image data, and an identifying unit for identifying, within the mediastinal region, one or more lymph node candidates using a set of predefined parameters that is particular to the mediastinal region.

The identifying unit may identify the one or more lymph node candidates by performing DGFR processing.

A computer system includes a processor and a program storage device readable by the computer system, embodying a program of instructions executable by the processor to perform method steps for detecting lymph nodes in a medical image, the method includes receiving image data, detecting one or more regions of interest from the received image data, identifying a set of one or more lymph node candidates using DGFR processing, and reducing the set of lymph node candidates based on one or more predefined parameters that are particular to the detected region of interest where each lymph node candidate is located.

The identified lymph node candidates may be displayed along with the image data and the location of the one or more identified lymph node candidates are highlighted or otherwise marked on the displayed image data.

BRIEF DESCRIPTION OF THE DRAWINGS

A more complete appreciation of the present disclosure and many of the attendant aspects thereof will be readily obtained as the same becomes better understood by reference to the following detailed description when considered in connection with the accompanying drawings, wherein.

DETAILED DESCRIPTION OF THE DRAWINGS

Figure 1:
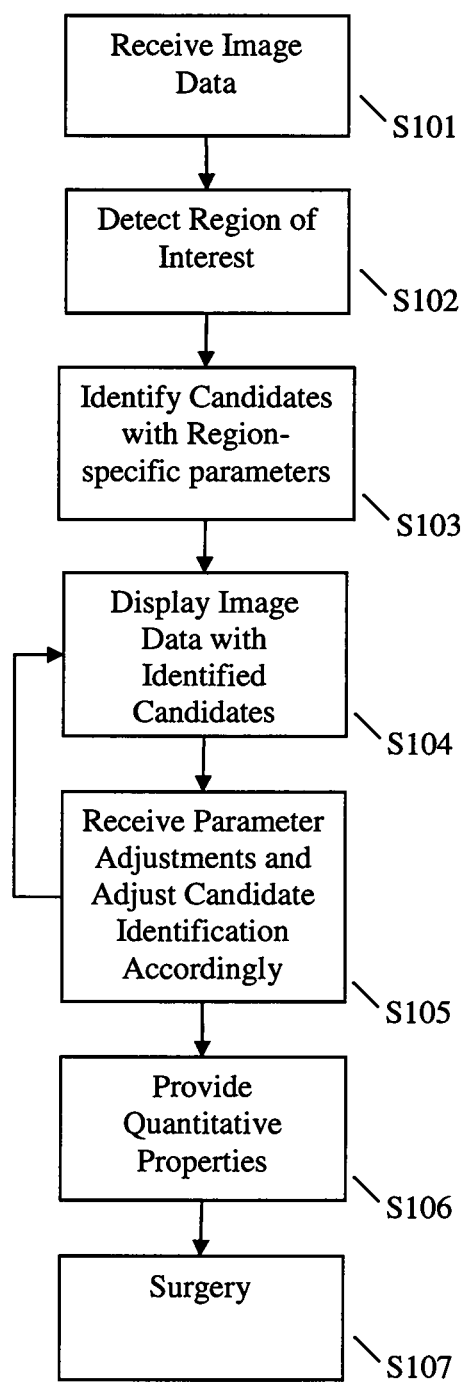
FIG. 1 is a flow chart illustrating a method for detecting lymph nodes in a medical image according to an exemplary embodiment of the present invention.

In describing exemplary embodiments of the present disclosure illustrated in the drawings, specific terminology is employed for sake of clarity. However, the present disclosure is not intended to be limited to the specific terminology so selected, and it is to be understood that each specific element includes all technical equivalents which operate in a similar manner.

Exemplary embodiments of the present invention seek to automatically detect the presence and location of lymph nodes from medical images. Medical images may be obtained from one or more medical imaging devices such as from a computed tomography (CT) scanner, a positron emission tomography (PET) scanner, or a magnetic resonance imager (MRI). Medical images may also be acquired using other medical imaging modalities. The resulting medical images may be either two-dimensional or three-dimensional and may illustrate the internal structure of the patient, either for the entire body or a portion thereof. For the purposes of providing a simplified disclosure, exemplary embodiments of the present invention may be described herein with respect to three-dimensional CT images, although it is to be understood that other images may be equally applicable to the present invention.

As discussed above, lymph nodes may be found throughout the human body primarily in the underarms, groin, neck, chest and abdomen. Because lymph nodes may be encountered in a wide variety of sizes and shapes, they may be particularly difficult to automatically identify. However, lymph nodes located in a particular portion of the body may share more structural similarities than lymph nodes of different portions of the body. For example, a lymph node located in the abdomen may be structurally more similar to another lymph node located in the abdomen than to a lymph node located in the groin. Accordingly, exemplary embodiments of the present invention seek to identify lymph nodes based on a set of characteristics and/or parameters that are specific to a particular region of the body.

For example, the regions of greatest concentration of lymph nodes: underarms, groin, neck, chest and abdomen, may each be considered a "highly-sensitive region" from the point of view of lymph node identification. Techniques directed to the detection of lymph nodes from medical image data may then be tailored for each of the particular highly-sensitive regions so that accurate identification of lymph nodes may be increased.

In detecting highly-sensitive regions, various techniques for computer vision may be used. These techniques may involve advanced image feature extraction and machine learning technologies. For example wavelet feature extraction and Adaboosting classifiers may be used in identifying highly-sensitive regions.

In identifying lymph nodes within a particular highly-sensitive region, various techniques for computer vision may be used. As discussed above, these techniques may explicitly use specifically designed image filters and/or involve machine learning approaches using training data obtained from previously identified lymph nodes from the particular highly-sensitive region.

Examples of such techniques may include divergent gradient field response (DGFR) processing. Application of DGFR processing for segmentation in medical imaging is discussed in U.S. patent application Ser. No. 11/062,411, filed Feb. 22, 2005 and U.S. patent application Ser. No. 10/985,548, filed Nov. 10, 2004, both of which are herein incorporated by reference.

In DGFR techniques, a "sphericity" response map may be generated within the region of interest. More specifically, in this response map, a pixel/voxel may have a higher response to denote that the structure surrounding the pixel/voxel is more similar to an ideal "sphere." Pixel/voxels having a lower response may thus denote that the structure surrounding the pixel/voxel is less similar to an ideal "sphere." The DGFR response map may be generated by calculating, for each voxel, a gradient map of a neighborhood around that pixel/voxel. The neighborhood may represent a set of pixel/voxels within a particular distance. The calculated neighborhood gradient map may then be compared to a set of template gradient maps calculated from the neighborhood of the center of an ideal sphere. The set of template gradient maps may be calculated from ideal spheres of various sizes, for example, from spheres having a diameter of one millimeter to several centimeters.

Accordingly, a profile is developed for the gradient field in the neighborhood of a center of a sphere for various sized spheres and the calculated neighborhood gradient maps for each image voxel are compared against the set of profiles. Thus a match between the calculated neighborhood gradient map and a profile suggests that a sphere of a particular size has been found within the image data. The particular size of the sphere is determined by the size characteristic of the particular profile that was matched.

The candidate lymph nodes may be obtained by segmenting the DGFR response map. Various techniques for segmentation may be used, e.g., watershed segmentation. Isolated regions with high DGFR responses may be regarded as lymph node candidates.

One or more parameters may be used to assist in the searching for lymph node candidates. These parameters may either affect the actual DGFR search and/or may be used to determine which lymph node candidates found using DGFR should be characterized as lymph nodes. For example, the DGFR search may produce a set of lymph node candidates and the parameters may be used to reduce the candidates to a subset thereof.

As discussed above, a specific set of parameters may be used for detecting lymph nodes of a particular highly-sensitive region. These parameters may be predetermined and may also be user adjustable, for example, as discussed in detail below. Examples of such parameters include intensity of the lymph node candidate, size of the lymph node candidate, sphericity of the lymph node candidate and other shape descriptors, for example, based on eigen values of the spatial coordinates covariance matrix of voxels/pixels belonging to a lymph node candidate. Here, eigen values may be calculated from the covariance matrix of the spatial coordinates of all voxels/pixels belonging to a lymph node candidate. For highly spherical lymph node candidates, the ratio between the largest eigen value and the smallest eigen value should approach unity while for elliptical shapes, this ratio should be relatively large. Thus the shape of the lymph node candidate may be characterized.

The intensity parameter may be a measure of average voxel intensity for the lymph node candidate. The measure of voxel intensity may depend on the modality of the medical image. For example, for image data acquired from a PET scan, voxel intensity may be defined as the SUV value, while for image data acquired from a CT scan, voxel intensity may be defined as the Hounsfield value.

Identification may be partially automatic or fully automatic. In partially automatic identification, user input may be used in identifying lymph nodes. For example, the user may adjust particular parameters used in identification to minimize false positives and/or false negatives. In fully automatic identification, identification of lymph nodes may be executed without user input. Exemplary embodiments of the present invention may present the option for a user to modify what may otherwise be a predefined set of search parameters such that identification may be fully automatic, where desired, but the user may retain the option to intervene by adjusting one or more parameters, where partially automatic identification is desired.

Identification may be performed using machine learning techniques with advanced image feature extraction, for example, using wavelet-like features. Learning may be based on prior information including medical image data where lymph nodes have been effectively identified. Learning may be performed separately for each highly-sensitive region such that identifications of lymph nodes in one highly-sensitive region do not affect the identification of lymph nodes on another highly-sensitive region.

The set of parameters to be used to identify lymph nodes may be different across different highly-sensitive regions. As discussed above, examples of parameters that may be used to identify lymph nodes include intensity of the lymph node candidate, size of the lymph node candidate, sphericity of the lymph node candidate and other shape descriptors.

According to an exemplary embodiment of the present invention, after automatic identification has been performed, the user may be provided with the option to modify the predetermined parameters to make identification either more or less inclusive. Modification of the parameters may result in a re-identification of lymph nodes for the highly-sensitive region whose parameters are being modified. Re-identification may be performed in real-time such that the user may see additional areas being identified as lymph nodes and/or areas previously identified as being lymph nodes loosing identification.

According to an exemplary embodiment of the present invention, one or more slider bars may be illustrated in conjunction with the medical image. Detected lymph nodes may be highlighted or otherwise identified within the medical image data. There may be one or more slider bars for each user-adjustable parameter. For example, there may be a first slider bar indicating minimum size and a second slider bar indicating maximum size. There may also be a third slider bar for minimum sphericity and a fourth slider bar for maximum sphericity. The user may then adjust slider bars, for example, using a pointing device such as a mouse, to change one or more parameters. For example, the user may lower the minimum size parameter to broaden what is considered to be a lymph node. As this parameter is changed, additional locations may light up as identified lymph nodes. The user may increase the minimum sphericity to narrow what is considered to be a lymph node. As this parameter is changed, locations previously highlighted as identified lymph nodes may be un-highlighted.

Identification may thus be modified in real-time by making changes to the parameters used to identify the lymph nodes. As re-identification may be computationally expensive, identification for a range of parameter values may be calculated in advance so that when the user adjusts a parameter value, predetermined identification data may be called up and displayed, thereby allowing the user to make changes in real-time so that the effects of those changes may be instantly observed.

However, it may not be necessary to repeat DGFR processing as changes are made to the parameters because the parameters may simply indicate which of the lymph node candidates found during the DGFR processing should be highlighted as lymph nodes.

In addition to identifying one or more lymph nodes based on the region-specific set of parameters, quantitative data may be obtained for each identified lymph-node candidate. Quantitative data may include, for example, a measure of a candidate's size and sphericity. Additionally, quantitative data may include a measure of the distance between the lymph node candidate and an anatomical structure, such as the distance to the lung wall. Such information may be used, for example, by a surgeon to perform lymphadenectomy and/or evaluate the risk that disease has spread to a particular lymph node.

FIG. 1 is a flow chart illustrating a method for detecting lymph nodes in a medical image according to an exemplary embodiment of the present invention. First image data may be received (Step S101). Image data may be three dimensional image data, for example, CT, MR, PET or SPECT image data. The received image data may be received directly from a medical imaging device or it may be retrieved from an image database.

One or more regions of interest may then be detected within the image data (Step S102). Each detected region of interest may represent a portion of the body where lymph nodes are commonly found. Such regions are described above as highly-sensitive regions. The detected regions of interest may include the underarms, groin, neck, chest and abdomen. More particularly, detected regions of interest may include one or more of the waldeyer ring, cervical, supraviscular, occipital and pre-auricular, infraclavicular, axillary and pectoral, epitrochlear and brachial, hilar, mediastinal, mesenteric, spleen, paraaortic, iliac, inguinal and femoral, and popliteal; with each detected region of interest including one or more of the above regions.

Next, one or more lymph node candidates may be identified within the image data using a set of predefined parameters for each detected region of interest (Step S103). Lymph node identification may be performed, for example, using DGFR. Identified lymph node candidates may then be displayed along with the image data (Step S104). For example, the location of the identified lymph nodes may be highlighted or otherwise marked on the image data. A user may then adjust one or more parameters used in identifying the lymph node candidates to make the characterization of lymph node candidates either more or less inclusive (Step S105). For example, the user may adjust the one or more parameters by interfacing with sliders displayed on a display device along with the image data. Changes to the set of identified lymph node candidates may occur in real-time so that the user may see either more or fewer highlighted regions on the image data as the parameters are changed. The user may thus adjust the parameters to reduce false positives and/or false negatives.

Accordingly, as the parameters are adjusted by the user, or shortly thereafter (Step S105), the image may be re-displayed with any changes that are made to the set of identified candidates (Step S14). The process of displaying (S104) and adjusting (S105) may continue, for example, until the user is satisfied with the set of identified lymph nodes.

One or more quantitative properties may then be displayed for each identified lymph node candidate (Step S106). Quantitative properties may include, for example, a measure of a candidate's size and sphericity. Additionally, quantitative properties may include a measure of the distance between the lymph node candidate and an anatomical structure, such as the distance to the lung wall. The lymph node candidate identification and quantitative properties may then be used in performing treatment, for example, to perform lymphadenectomy.

Figure 2:
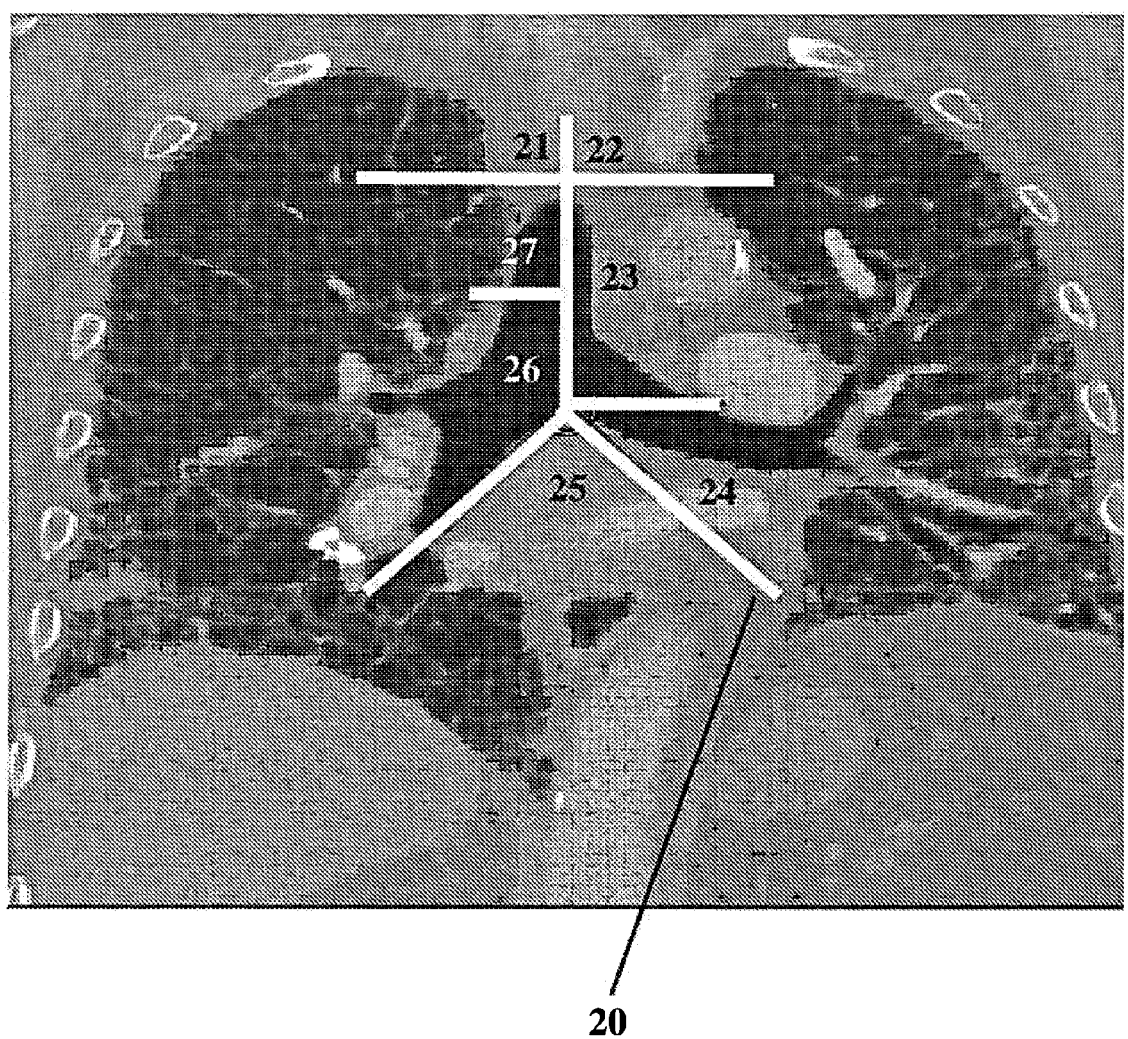
FIG. 2 is a medical image illustrating the mediastinal region according to an exemplary embodiment of the present invention.

As discussed above, the mediastinal region may be a particular region of interest. The mediastinal region may be further divided into a set of seven lymph node stations. By dividing the mediastinal region according to the various lymph node stations, identified lymph nodes may be further characterized according to their lymph node station. FIG. 2 is a medical image illustrating the mediastinal region according to an exemplary embodiment of the present invention. As can be seen from FIG. 2, the mediastinal region is divided into a first 21, second 22, third 23, fourth 24, fifth 25, sixth 26 and seventh 27 lymph node station by a set of dividing lines 20.

Exemplary embodiments of the present invention may automatically divide the mediastinal region into lymph node stations based on structural landmarks found within the medical image. Automatic segmentation of lymph node stations from within the mediastinal region may be performed, for example, using a computer learning approach that is training on prior knowledge of identified lymph node stations from a set of training images.

When applied to the method described above and illustrated in FIG. 1, lymph node candidates identified within the mediastinal region may be further characterized in terms of their lymph node station.

Figure 3:
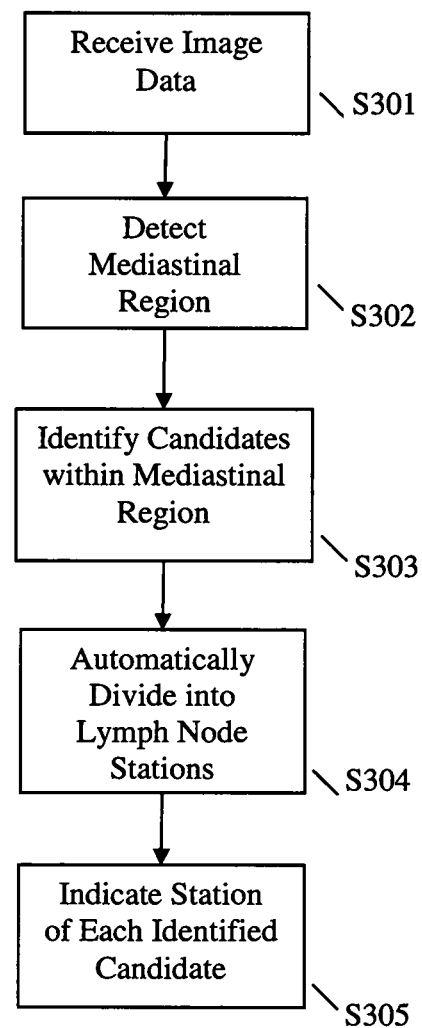
FIG. 3 is a flow chart illustrating a method for detecting lymph nodes in a medical image according to an exemplary embodiment of the present invention.

FIG. 3 is a flow chart illustrating a method for detecting lymph nodes in a medical image according to an exemplary embodiment of the present invention. First, image data may be received (Step S301). Next, at least a mediastinal region may be detected from the image data (Step S302). Other regions may be similarly detected, for example, as described above. One or more lymph node candidates may then be identified within the mediastinal region (Step S303). Where other regions have been detected, lymph node candidates may be identified within those regions as well. The mediastinal region may then be automatically divided into one or more lymph node stations (Step S304). An indication may then be provided as to which lymph node station each identified lymph node candidate is located within (Step S305). The exemplary embodiment described with reference to FIG. 3 may be combined with the exemplary embodiments described above, particularly to the exemplary embodiment described above with respect to FIG. 1.

Figure 4:
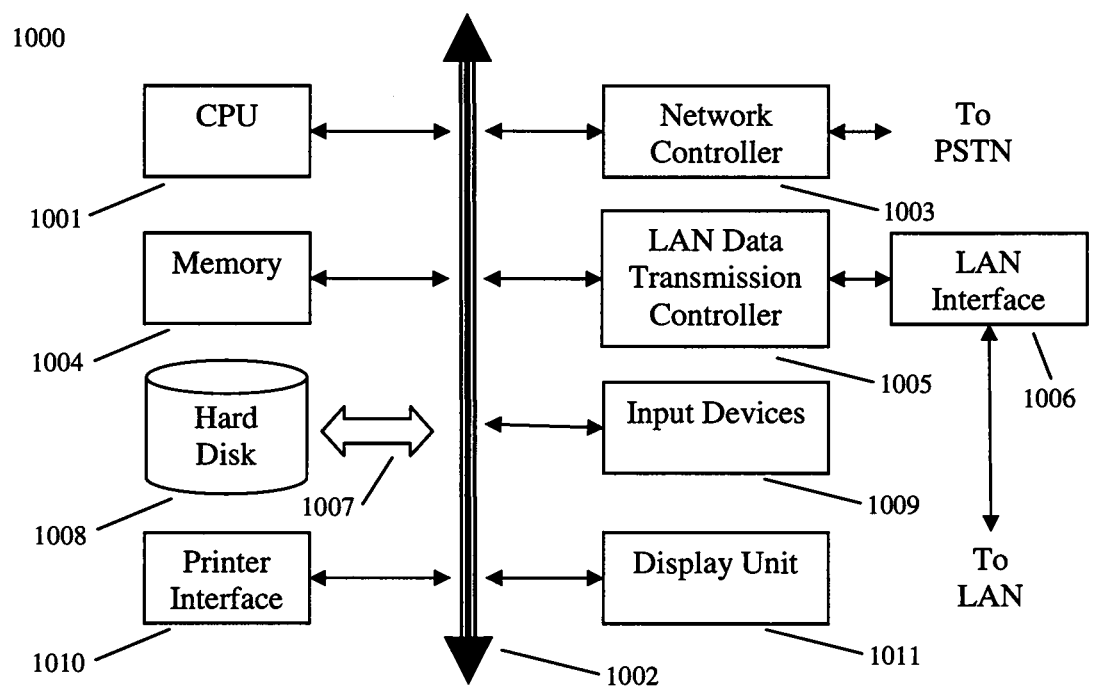
FIG. 4 shows an example of a computer system capable of implementing the method and apparatus according to embodiments of the present disclosure.

FIG. 4 shows an example of a computer system which may implement a method and system of the present disclosure. The system and method of the present disclosure may be implemented in the form of a software application running on a computer system, for example, a mainframe, personal computer (PC), handheld computer, server, etc. The software application may be stored on a recording media locally accessible by the computer system and accessible via a hard wired or wireless connection to a network, for example, a local area network, or the Internet.

The computer system referred to generally as system 1000 may include, for example, a central processing unit (CPU) 1001, random access memory (RAM) 1004, a printer interface 1010, a display unit 1011, a local area network (LAN) data transmission controller 1005, a LAN interface 1006, a network controller 1003, an internal bus 1002, and one or more input devices 1009, for example, a keyboard, mouse etc. As shown, the system 1000 may be connected to a data storage device, for example, a hard disk, 1008 via a link 1007.

Exemplary embodiments described herein are illustrative, and many variations can be introduced without departing from the spirit of the disclosure or from the scope of the appended claims. For example, elements and/or features of different exemplary embodiments may be combined with each other and/or substituted for each other within the scope of this disclosure and appended claims.

What is claimed is:

1. A method for detecting lymph nodes in a medical image, comprising:
receiving an image data;
detecting one or more highly-sensitive regions of interest from the image data where lymph nodes are commonly found;
identifying one or more lymph node candidates within the detected one or more highly-sensitive regions of interest using a set of predefined parameters that is particular to the detected region of interest where each lymph node candidate is located;
obtaining a quantitative data for each of the one or more identified lymph node candidates, the quantitative data being selected from the group including: shape, size, and sphericity;
displaying the one or more identified lymph node candidates along with the image data and the quantitative data;
receiving user-provided adjustments to the set of predefined parameters that are particular to the detected one or more highly-sensitive regions of interest; and
re-identifying the one or more lymph node candidates based on the adjusted parameters.

2. The method of claim 1, wherein the received image data is three-dimensional image data acquired from a computed tomography (CT), magnetic resonance (MR), positron emission tomography (PET) or single-photon emission computed tomography (SPECT) imaging device.

3. The method of claim 1, wherein the received image data is sent from a medical image database.

4. The method of claim 1, wherein the set of predefined parameters is different across different highly-sensitive regions of interest.

5. The method of claim 4, wherein one of the one or more highly-sensitive regions of interest include underarms, groin, neck, chest or abdomen.

6. The method of claim 4, wherein one of the one or more highly-sensitive regions of interest includes a mediastinal region.

7. The method of claim 4, wherein detecting one or more highly-sensitive regions of interest includes performing wavelet-like feature extraction and machine learning methods.

8. The method of claim 1, wherein identifying the one or more lymph node candidates includes performing divergent gradient field response (DGFR) processing.

9. The method of claim 1, wherein the location of the one or more identified lymph node candidates are highlighted or otherwise marked on the displayed image data.

10. The method of claim 1, wherein the lymph node candidates re-identified based on the adjusted parameters are displayed along with the image data in real-time as the adjustments are provided.

11. The method of claim 1, wherein identification of the one or more lymph nodes is performed using a computer vision approach that is developed from machine learning using training data obtained from previously identified lymph nodes particular to the detected region of interest where each lymph node candidate is located, wherein the machine learning is performed separately for each identified highly-sensitive region.

12. The method of claim 1, additionally comprising the step of calculating one or more quantitative properties for each identified lymph node candidate.

13. The method of claim 12, wherein the one or more quantitative properties includes size, sphericity or a distance to a lung wall.

14. The method of claim 12, wherein one of the regions of interest is a mediastinal region and the method additionally comprises:
    automatically dividing the mediastinal region into one or more lymph node stations; and
    providing, as one of the one or more quantitative properties, an indication of which lymph node station each identified lymph node candidate is located within.

15. The method of claim 1, wherein the identification of lymph node candidates is used to perform lymphadenectomy.

16. The method of claim 1 wherein the set of predefined parameters include intensity, size, sphericity or other shape descriptor of a lymph node candidate.

17. A computer system comprising:
    a processor; and
    a program storage device readable by the computer system, embodying a program of instructions executable by the processor to perform method steps for detecting lymph nodes in a medical image, the method comprising:
    receiving image data;
    detecting one or more highly-sensitive regions of interest from the received image data where lymph nodes are commonly found;
    identifying a set of one or more lymph node candidates within the detected one or more highly-sensitive regions of interest using divergent gradient field response (DGFR) processing;
    obtaining a quantitative data for each of the one or more identified lymph node candidates, the quantitative data being selected from the group including: shape, size, and sphericity;
    reducing the set of lymph node candidates based on one or more predefined parameters that are particular to the detected region of interest where each lymph node candidate is located;
    displaying the one or more identified lymph node candidates along with the image data and the quantitative data;
    receiving user-provided adjustments to the set of predefined parameters that are particular to the detected one or more highly-sensitive regions of interest; and
    re-identifying the one or more lymph node candidates based on the adjusted parameters.

18. The computer system of claim 17, wherein the one or more identified lymph node candidates are displayed along with the image data and the location of the one or more identified lymph node candidates are highlighted or otherwise marked on the displayed image data.

* * * * *